J. T. BUEL.
FISHING-TACKLE.

No. 171,769. Patented Jan. 4, 1876.

WITNESSES:
Chas. Nida
Alex T. Roberts

INVENTOR:
J. T. Buel
BY
ATTORNEYS.

UNITED STATES PATENT OFFICE.

JULIO T. BUEL, OF WHITEHALL, NEW YORK.

IMPROVEMENT IN FISHING-TACKLES.

Specification forming part of Letters Patent No. 171,769, dated January 4, 1876; application filed November 27, 1875.

*To all whom it may concern:*

Figure 1:
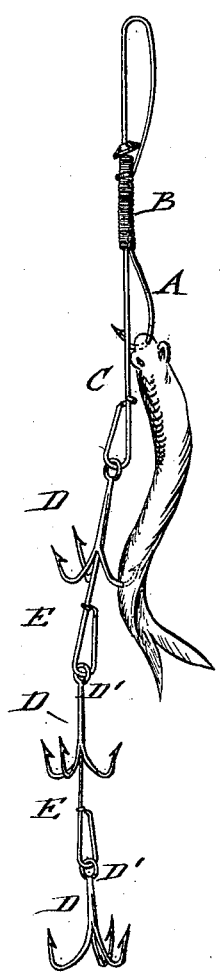
Figure 2:
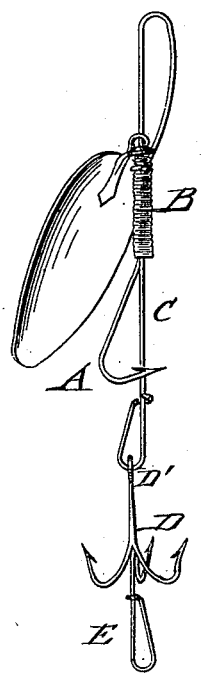
Figure 3:
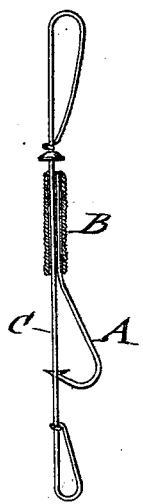

Be it known that I, JULIO T. BUEL, of Whitehall, Washington county, New York, have invented a new and Improved Spinning-Tackle, of which the following is a specification:

Figure 1 represents a perspective view of my improved spinning-tackle, shown with a minnow attached. Fig. 2 represents a view of the same as used with a spoon; and Fig. 3 a detail sectional view of the hook device used for securing the head of the bait.

Similar letters of reference indicate corresponding parts.

This invention has reference to improvements in spinning-tackle, by which a reliable adjustable device for attaching minnows or other bait of different size is furnished, and as many additional hooks as may be required for the size of the bait be applied to the main shank without the use of thread, gimp, or gut-strings.

The invention consists of a spring-hook that is attached to a sliding wire ferrule, and adjusted along the connecting-shank of the tackle to set minnows or other bait of different size thereon. A gang of two or more hooks, according to the size of the bait, is employed and connected by means of a central wire extension with snap-hook engaging an eye at the shank of the next adjoining hook.

In the drawing, A represents the spring-hook device, to which the head of the minnow or other bait is applied, as shown in Fig. 1. The shank of the spring-hook is secured to a wire ferrule, B, that slides along the shank C, being adjusted at any point on the same, and retained firmly by the end of the spring-hook being carried sidewise over the shank to bear rigidly thereon.

In case additional fastening of the spring-hook is desired, the snap end of the upper shank-hook may be brought over the sleeve B. The spring-hook is thus adjusted to the size of the minnow, and may also be readily turned on the shank to give the required twist to the bait that secures the slower or quicker spinning of the same in the water.

When no bait is available, the spoon may be placed on a washer of the shank above the sleeve, in the usual manner.

The connection of the shank of the spring-hook with the draw-line and with the gang of additional hooks D, to which the bait is also attached, is made by snap-hooks or spring-eyes at both ends, as shown in the drawing. A gang of one or more hooks, D', is applied to the shank of the spring-hook, according to the size of the bait, each hook D being provided with a central wire-extension and snap-hook, E, that forms the connection with the eye D' of the adjoining hook of the gang.

The eyes and snap-hooks allow the ready connection and disconnection of the hooks to adjust the gang to the size of the bait, and dispense with any gimp or gut-string connection, that is frequently cut through by the sharp teeth of the fish.

Having thus described my invention, I claim as new and desire to secure by Letters Patent—

1. In spinning-tackle, the combination of an adjustable spring-hook applied to a sliding ferrule, with the shank of the gang-line and hook-connecting part, substantially in the manner and for the purpose set forth.

2. A gang of hooks, being adjustable to the size of the bait, and made of a central lower wire-extension with snap-hook end, in connection with an eye at shank end of adjoining hook, substantially as specified.

J. T. BUEL.

Witnesses:
PAUL GOEPEL,
T. B. MOSHER.